Figure 1:
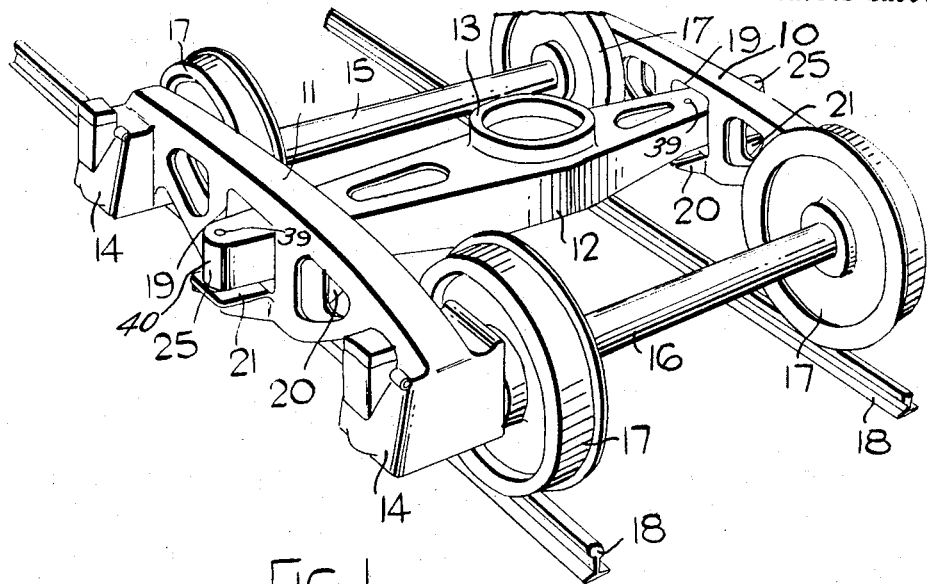

Nov. 14, 1967  F. E. SHEPPARD  3,352,255
BOGIE WITH ELASTOMERICALLY SPRUNG BOLSTER
Filed Aug. 16, 1963  2 Sheets-Sheet 1

INVENTOR
FRANCIS ERNEST SHEPPARD
By Linton and Linton
ATTORNEYS

Nov. 14, 1967      F. E. SHEPPARD      3,352,255

BOGIE WITH ELASTOMERICALLY SPRUNG BOLSTER

Filed Aug. 16, 1963      2 Sheets-Sheet 2

INVENTOR

FRANCIS ERNEST SHEPPARD

By *Linton and Linton*

ATTORNEYS

United States Patent Office 3,352,255
Patented Nov. 14, 1967

3,352,255
BOGIE WITH ELASTOMERICALLY
SPRUNG BOLSTER
Francis Ernest Sheppard, Oadby, England, assignor to
Rolls-Royce Limited, Derby, England
Filed Aug. 16, 1963, Ser. No. 302,638
Claims priority, application Great Britain, Aug. 20, 1962,
31,961/62
9 Claims. (Cl. 105—197)

This invention is for improvements in or relating to suspension systems for vehicles and has for one of its objects to provide an improved bogie suspension particularly suitable for freight vehicles. A more particular object is to provide means for equalising the load on the wheels on each side of a bogie, while maintaining the normal relative positions of the side members in relation to one another and to a cross member or members.

In accordance with the invention there is provided a bogie frame comprising two side members and a cross member (sometimes referred to as a bolster) or a plurality of cross members carrying a bogie swivel bearing, the ends of which cross member or members are supported by the side members, and having at each side of the frame a plurality of bell springs spaced apart as viewed in plan through which the support of the cross member or members is effected. The term "bell spring" is used herein to refer to a mounting comprising a hollow resilient elastomeric body roughly of the shape of a bell in outline mounted on a pin which is of tapered form being broadest at its base fitting in a correspondingly shaped hole in the body, the body being adapted to be received in a tapered conical recess in a housing.

In practising the present invention "bell springs" are situated in groups of two or more at the opposite ends of the cross member or bolster. In addition to providing resilience for supporting the bolster the "bell springs" provide freedom for one wheel to rise or fall in relation to the remainder. By adequate spacing of the "bell springs" in the transverse direction in each group they are caused to provide substantial resistance to turning movement of the side members relatively to the bolster about upstanding axes thus ensuring that as viewed in plan each side member remains parallel to and squarely placed in relation to the other.

The present invention is particularly applicable to a frame for a bogie having four or more wheels in which the side members are carried at least partly by bearings on front and back axles of front and rear wheels and having the ends of the cross member or members projecting into throughways or recesses in the side members and supported at each side of the frame by a plurality of spaced bell springs mounted between the cross member or members and the respective side members. The bell springs may be spaced widthwise or lengthwise of the bogie frame.

Figure 2:
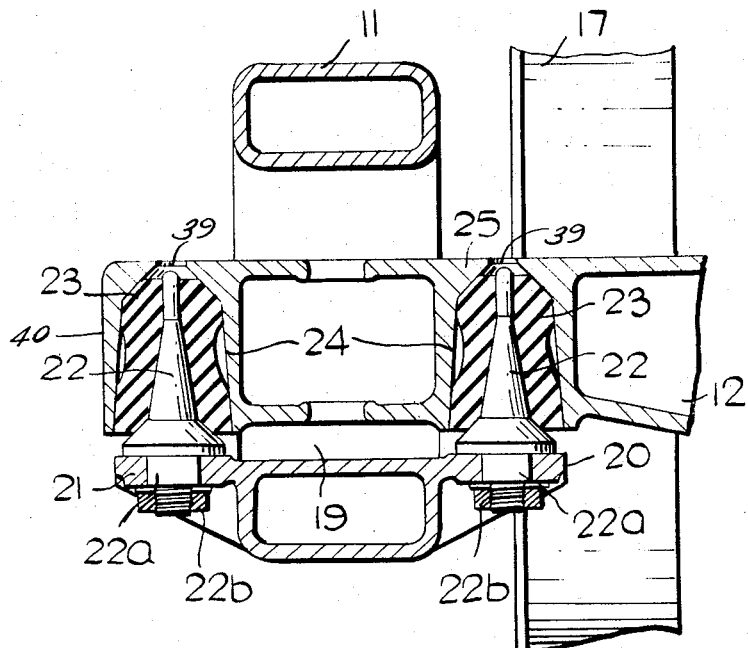
Figure 3:
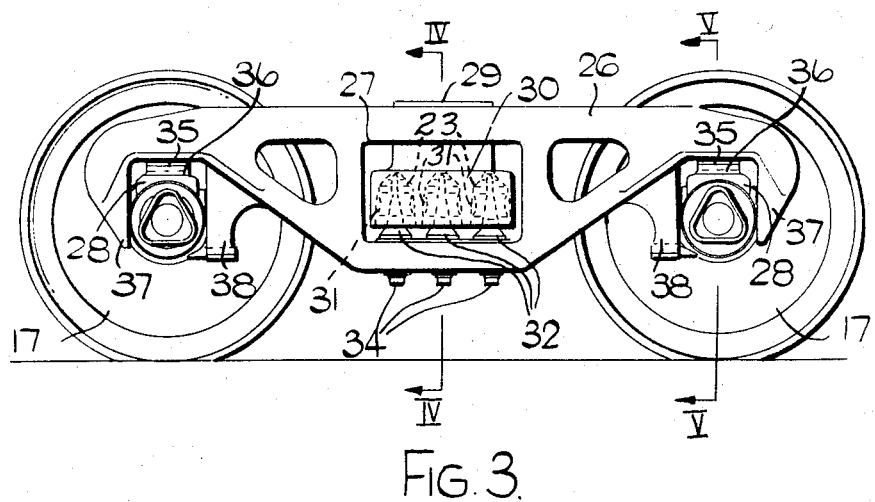
Figure 4:
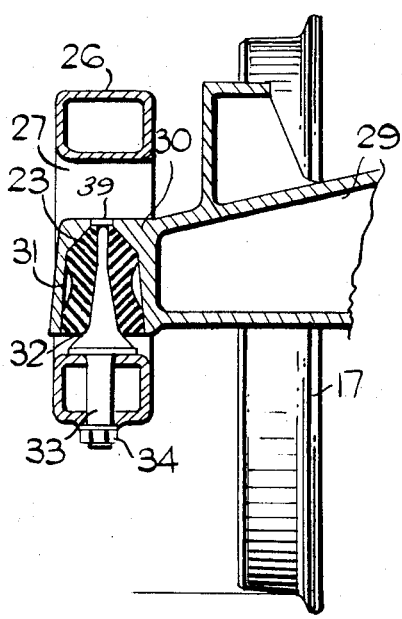
Figure 5:
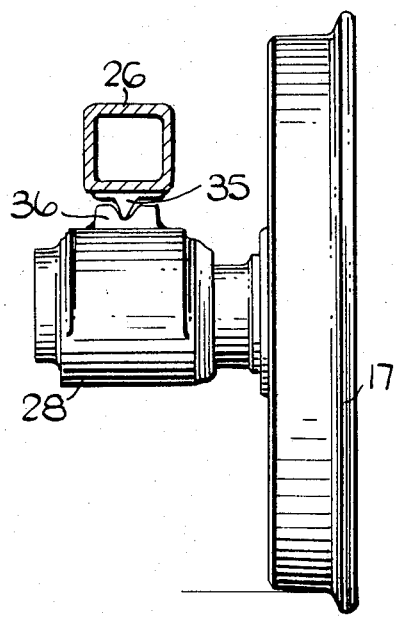

The foregoing and other provisions of the invention are incorporated in certain convenient forms of construction illustrated by way of example in the accompanying drawings which will now be described with reference to the drawings in which:

FIGURE 1 is a perspective view of a four wheeled bogie for a rail vehicle incorporating the present invention in one form, FIGURE 2 is a part elevation view in cross section taken centrally through one end of the cross member of the frame of FIG. 1, FIGURE 3 is a view in side elevation of a modified form of bogie frame construction, FIGURE 4 is a part elevation view in cross section taken on the line IV—IV of FIG. 3, and FIGURE 5 is a similar view taken on the line V—V of FIG. 3.

Referring firstly to FIG. 1 there is shown a bogie frame comprising side members 10 and 11 and a central cross member or bolster 12 which carries centrally at 13 a mounting for the central swivel bearing of the bogie frame. The side members 10 and 11 are carried by usual axle boxes 14 which are supported on the ends of axles 15 and 16 the latter being fitted with wheels 17 of usual form which run on rails shown at 18. The side members 10 and 11 are formed with central throughways 19 and the ends of the cross member 12 project through these and overlie inwardly and outwardly projecting ledges 20 and 21 extending from the bottoms of the throughways 19. From the ledges 20 and 21 there upstand tapered pins 22 of FIG. 2, of the bell springs, on which pins hollow resilient bodies 23 of the bell springs are mounted being received in tapered conical seatings or cavities 24 recessed behind end face 40 of end parts 25 of the cross-member or bolster 12. The pins 22 of the bell springs have stems 22a which pass through apertures in the ledges 20 and 21 and are attached by locking nuts 22b. It will be seen that the body portions 23 of resilient elastomeric material are roughly of the shape of a bell in outline and act as springs by virtue of their resilient nature. The cross member 12 is thus supported at its end on the side members 10 and 11 by pairs of bell springs 22, 23 in each of which pairs the springs are spaced widthwise of the frame. Cross-member 12 is provided with small circular apertures 39 directly above the axis of each of the pins 22.

In the modified form of construction shown in FIGS. 3 to 5, modified side members 26 are employed in place of the members 10 and 11 and they are formed with central throughways 27 which are extended longitudinally. The side members 26 are supported by axle boxes 28 for receiving the ends of front and rear axles carrying the wheels 17. A modified cross member or bolster 29 is provided in place of the cross member 12 of FIG. 1 and it has widened and low positioned end parts 30 formed with recesses providing housings for three bell springs spaced longitudinally of each side member 26. The housings are indicated at 31 in FIGS. 3 and 4. The bottom part of each side member 26 beneath the throughway 27 supports the three pins 32 of the bell springs which pins are similar to the pins 22 shown in FIG. 2 but have longer stems 33 which are passed through apertures in the bottom of the side member 26 and secured by locking nuts 34. The pins 32 are spaced longitudinally of the side members 26 to correspond in position to the recessed housings 31 formed in the ends 30 of the cross member. The bell springs are completed by resilient elastomeric bodies 23 as in the construction of FIGS. 1 and 2.

The support of the side members 26, FIGS. 3 and 5 by the axle boxes 28 is effected by means of knife edges extending longitudinally, thereby permitting transverse movement of the cross member 29 as a result of rocking of the side frame 26 whenever this occurs. The knife edges are shown at 35 as depending from the end portions of the side members 26 and fitting in grooved seatings 36 on the tops of the axle boxes 28 which are received between downwardly projecting parts 37 and 38 of the side members 26.

It will be seen that the modified form of construction of FIGS. 3 to 5 is similar to that of FIGS. 1 and 2 except that instead of the plurality of bell springs at each end of the central cross member being spaced widthwise the springs are spaced lengthwise of the side members. In both constructions the bell springs 23 or 33 at each side of the frame supporting the cross member or bolster 12 or 29 are symmetrically placed with respect to the longitudinal centre line of the frame, thereby avoiding out of balance thrusts on the side members. It is obvious that in either form of construction there may be only two or more than two bell springs arranged in spaced relationship.

Instead of having only a single cross member such as 12 or 29 there may be two parallel cross members carried at their ends on the side members through bell springs and spaced longitudinally of the bogie frame, with a central longitudinal member connecting the two cross members and carrying the swivel bearing of the bogie frame. With the cross members connected rigidly by the central member, there need be only a single bell spring at each end of each cross member. This arrangement is particularly suitable for a six wheeled bogie having a central axle as well as front and rear axles in which case the cross members may be positioned respectively midway between the front and central axles and the central and rear axles, as seen in plan view.

By the provisions of the invention the bogie assembly is constructed in such manner as to provide the requisite cushioning mounting for the bogie wheels 17 at the same time the bogie structure is stabilised against distortion out of true by thrust tending to turn the side members 10, 11 or 26 about a vertical axis relatively to the cross member or bolster 12 or 29.

It will be evident that with side members of suitable design and strength, central recesses may be formed in their upper parts, in place of the throughways 19 or 27, to receive the ends of the cross member 12 or 29.

The invention has a useful application to bogies for rail freight vehicles but may be applied to bogies of road vehicles.

What I claim is:

1. A frame comprising two side members, bearing mountings for at least front and back wheel axles provided on the side members, axles mounted in said bearings, wheels on said axles, at least one cross member extending between the side members with ends projecting into throughways formed in the side members each said cross-member being terminally provided with frusto-conical cavities, a swivel bearing supported at least partly by said cross member, and a plurality of spaced bell springs on each side member mounted in said cavities to support the cross-member ends, a frusto-conical center pin within said cavity, each said bell spring having a unitary resilient elastomeric frusto-conical member formed with coaxial internal and external frusto-conical thrust surfaces, respectively engaging the wall of said cavity and frusto-conical center pin, said bell springs forming the sole connection between said side members and said cross-member.

2. A bogie frame according to claim 1 having a plurality of bell springs spaced widthwise of the bogie frame at each end of a cross member to support the latter.

3. A bogie frame according to claim 2 comprising ledges reaching inwardly and outwardly from the bottoms of the throughways in the side members and having the bell sprigs mounted on said ledges.

4. A bogie frame according ot claim 1 comprising a plurality of bell springs at each side of the bogie frame spaced lengthwise of the bogie frame and supporting the cross member ends.

5. A bogie frame according to claim 1 wherein the throughways in the side members have a longitudinal extent sufficient to receive the spaced bell springs, and having a plurality of bell springs spaced apart longitudinally mounted on the bottom wall of each throughway for supporting the cross member ends.

6. A bogie frame according to claim 1 having the bell springs at each side of the frame symmetrically arranged with respect to the longitudinal centre line of the frame.

7. A bogie frame comprising two side members, corresponding axle bearings provided on each of said side members forwardly and rearwardly thereof, front and back axles mounted in said axle bearings, wheels on said axles, a bogie swivel bearing support comprising at least one cross member having its ends intersecting the lines of the side members as seen in plan, each said cross-member being terminally provided with frusto-conical cavities, a plurality of bell springs spaced apart as viewed in plan on each side of said side members a frusto-conical center pin mounted on each said side member within said cavity, said bell springs being interposed between the cross member ends and the side members and forming the sole connection therebetween, each said bell spring having a unitary resilient elastomeric frusto-conical member formed with coaxial internal and external frusto-conical thrust surfaces respectively engaging the wall of said cavity and said center pin, and a swivel bearing carried centrally on said support.

8. A bogie frame according to claim 7 having fulcrums extending longitudinally of said bogie frame interposed between said side members and said axle bearings, and having said spaced bell springs on each said side member disposed in a line extending longitudinally of said bogie frame.

9. A bogie frame according to claim 8 having said bell springs of each said side member positioned with their centers substantially in a vertical plane containing the axle bearing fulcrums on the same side of said bogie frame.

References Cited

UNITED STATES PATENTS

| | | | |
|---|---|---|---|
| 35,410 | 5/1862 | Bridges | 105—197 |
| 1,306,460 | 6/1919 | Beasley | 105—223 |
| 1,478,566 | 12/1923 | Hendricks | 105—206 |
| 2,150,896 | 3/1939 | Muchnic | 105—199 |
| 2,165,702 | 7/1939 | Haushalter | 267—63 |
| 2,211,462 | 8/1940 | Hobson | 105—197 |
| 2,260,508 | 10/1941 | Chambers | 105—197 |
| 3,064,588 | 11/1962 | Zion | 105—182 |

ARTHUR L. LA POINT, *Primary Examiner.*

MILTON BUCHLER, *Examiner.*

H. BELTRAN, *Assistant Examiner.*